United States Patent [19]
Livingston

[11] Patent Number: 6,033,716
[45] Date of Patent: Mar. 7, 2000

[54] ANIMAL FEEDS COMPRISING FORMULATED POULTRY BIO-SOLIDS AND GROWING HOUSE LITTER

[75] Inventor: Andrew Livingston, Independence, Kans.

[73] Assignee: Productization, Inc., Independence, Kans.

[21] Appl. No.: 09/170,524

[22] Filed: Oct. 13, 1998

[51] Int. Cl.[7] .................................................. A23C 1/04
[52] U.S. Cl. ...................... 426/644; 126/285; 126/453; 126/473; 126/601; 126/646; 426/647; 426/807
[58] Field of Search ..................... 426/285, 453, 426/473, 518, 519, 520, 641, 644, 646, 647, 635, 601, 805, 807, 96, 465

[56] References Cited

U.S. PATENT DOCUMENTS

| | | |
|---|---|---|
| 3,831,288 | 8/1974 | Stribling et al. . |
| 3,939,280 | 2/1976 | Karnemaat . |
| 4,088,796 | 5/1978 | Persson . |
| 4,210,680 | 7/1980 | Dawson et al. . |
| 4,217,370 | 8/1980 | Rawlings et al. .................. 426/98 |
| 4,259,361 | 3/1981 | Procter . |
| 4,349,572 | 9/1982 | Larson et al. . |
| 4,369,194 | 1/1983 | Arsovic . |
| 4,526,791 | 7/1985 | Young . |
| 4,593,614 | 6/1986 | Berge et al. . |
| 4,728,517 | 3/1988 | Markham et al. . |
| 4,808,429 | 2/1989 | Freeman . |
| 4,813,996 | 3/1989 | Gardner et al. . |
| 4,997,469 | 3/1991 | Moore . |
| 5,021,077 | 6/1991 | Moore ..................................... 426/453 |
| 5,021,247 | 6/1991 | Moore . |
| 5,185,174 | 2/1993 | Sawhill .................................. 426/635 |
| 5,227,190 | 7/1993 | Ward . |
| 5,574,139 | 11/1996 | Holm-Jensen . |
| 5,755,852 | 5/1998 | Northrop . |

*Primary Examiner*—David Lacey
*Assistant Examiner*—Hao Mai
*Attorney, Agent, or Firm*—Hovey, Williams, Timmons & Collins

[57] ABSTRACT

Animal feeds and methods of forming animal feeds are provided wherein the feeds are formed by mixing poultry house litter and slaughterhouse wastewater sludges, followed by drying of the resulting mixture in a hot air convection rotary drum dryer. The resulting feed is high in fat and protein, and can be fed as a meal or in pelletized form. In a preferred embodiment, the feeds are formed by mixing litter comprising poultry manure and poultry feed with wastewater sludges comprising poultry fat, followed by drying in the rotary drum dryer. The feeds of the invention can be used to provide a high fat, high protein diet to any animal, particularly ruminants and aquatic animals.

21 Claims, 2 Drawing Sheets

ANIMAL FEEDS COMPRISING FORMULATED POULTRY BIO-SOLIDS AND GROWING HOUSE LITTER

BACKGROUND OF THE INVENTION

1. Field of the Invention

The present invention is broadly concerned with animal feeds and methods for making those feeds comprising forming a mixture including poultry house litter and slaughterhouse wastewater sludges. The animal feeds of the invention are in the form of a fine meal or pellets and have high fat and high protein concentrations. In preferred methods of the invention, mixtures of litter and wastewater sludges are dried in a hot air convection rotary drum dryer so that a large portion of the water is removed from the mixture and the nutrients (such as protein) are not destroyed. The meals and pellets of the invention make nutritional feeds for all animals, particularly ruminants. The pellets of the invention are especially useful as an aquatic feed due to their high fat content which enables the pellets to float in water.

2. Description of the Prior Art

Poultry house litter generally comprises poultry droppings, feathers, bedding material (such as wood shavings, straw, rice hulls, peanut hulls, and mixtures thereof), poultry feed, and mixtures thereof. Slaughterhouse wastewaters generally comprise blood serum, water, and sludges which include all wastes that result from the slaughtering process, such as fat, bones, skin, viscera, offal, and mixtures thereof (As used hereinafter, "slaughterhouse" refers to any location where the slaughtering and/or processing (for human consumption or otherwise) of any animal, including poultry is carried out. The term "wastewaters" refers to all waste products which result from the slaughtering and/or processing (for human consumption or otherwise) of any animal, including poultry.) Approximately 25 million tons of poultry house litter and 12 million tons of sludges from poultry processing wastewater are generated each year. It is estimated that about 75% of these amounts are produced in just 10 states in the southeast region of the United States.

All of this waste must be disposed of in some manner. In the past, poultry house litter has been applied to fields as a fertilizer. However, run-off from these fields pollutes ground and surface waters, and thus field application should be avoided as much as possible. Slaughterhouse wastewaters are usually disposed of by contracting with a party to remove the wastewater (which contain sludges) to some other site for appropriate treatment.

There is a need for a process to dispose of both poultry house litter and slaughterhouse wastewaters in a manner that is convenient, economical, and environmentally friendly. This process should produce an animal feed that is both high in fat and high in protein, thus resulting in a useful product made from waste generated by the poultry industry.

SUMMARY OF THE INVENTION

The instant invention overcomes the above problems by providing a nutritional animal feed and a process for making the animal feed comprising mixing growing house litter with wastewater sludges and drying the mixture to remove water from the mixture.

In more detail, the house litter comprises a component selected from the group consisting of animal (as used hereinafter, the term "animal" includes poultry) excrement, feathers, poultry feed, poultry bedding material, and mixtures thereof. Preferably, the litter comprises a component selected from the group consisting of poultry manure, poultry feed, and mixtures thereof The wastewater sludges utilized in the invention include a component selected from the group consisting off at, blood serum, bones, skin, viscera, and mixtures thereof. Preferably, the sludges comprise a component selected from the group consisting of poultry fat, poultry blood serum, poultry bones, poultry skin, poultry viscera, and mixtures thereof, and more preferably the sludges comprise poultry fat. The wastewater sludges comprise from about 10–20% by weight solids, and preferably from about 80–90% by weight water, based upon the total weight of the sludges taken as 100% by weight. Furthermore, the wastewater sludges include from about 10–30% by weight fat, and preferably from about 15–20% by weight fat, based upon the total weight of the sludges taken as 100% by weight.

In the methods of the invention, a mixture is formed comprising the house litter and wastewater sludges. That mixture is then fed into a hot air convection rotary drum dryer and subjected to hot air which removes at least a portion of the water from the mixture. Advantageously, drying the mixture with a hot air convection rotary drum dryer removes large quantities of water without destroying the nutrients (such as protein) found in the mixture.

In the dryer, the mixture is subjected to hot air having a temperature of from about 500–900° F., and preferably from about 600–800° F. The residence time of the mixture in the dryer is from about 1–2 minutes, and preferably from about 0.5–1 minute. Upon emerging from the dryer, the dried meal should have a total water content of less than about 15% by weight, and preferably less than about 10% by weight, based upon the total weight of the dried meal taken as 100% by weight. The dried meal also has a total fat content of at least about 10% by weight, and preferably at least about 25% by weight, as well as a total protein concentration of at least about 15% by weight, and preferably at least about 18% by weight, based upon the total weight of the dried meal taken as 100% by weight. The average particle size of the dried meal is preferably less than about ⅛ in., and more preferably less than about ¹⁄₁₆ in. The meal can be directly fed to the animal, or it can be formed into a pellet using any conventional pelletization methods. The pelleted feed has an actual density of from about 21–35 lb/ft³, and preferably from about 29–32 lb/ft³.

When it is desirable to have a feed with higher protein and fat concentrations, dried meal (prepared as described above) can be mixed with wastewater sludges (without adding house litter to the dried meal/wastewater sludges mixture), and the resulting mixture can then be dried via a hot air convection rotary drum dryer as described above. Dried meals in accordance with this embodiment will have a total fat content of at least about 20% by weight, and preferably at least about 25% by weight, and a total protein concentration of at least about 15% by weight, and preferably at least about 23% by weight, based upon the total weight of the dried meal taken as 100% by weight. This higher fat, higher protein meal can likewise be formed into a pellet utilizing known pelletization methods. It will be appreciated that this higher fat, higher protein dried meal can again be mixed with wastewater sludges to provide an even higher fat, higher protein meal. This process can be repeated until the desired protein and fat contents are achieved.

DETAILED DESCRIPTION OF THE PREFERRED EMBODIMENTS

Figure 1A:
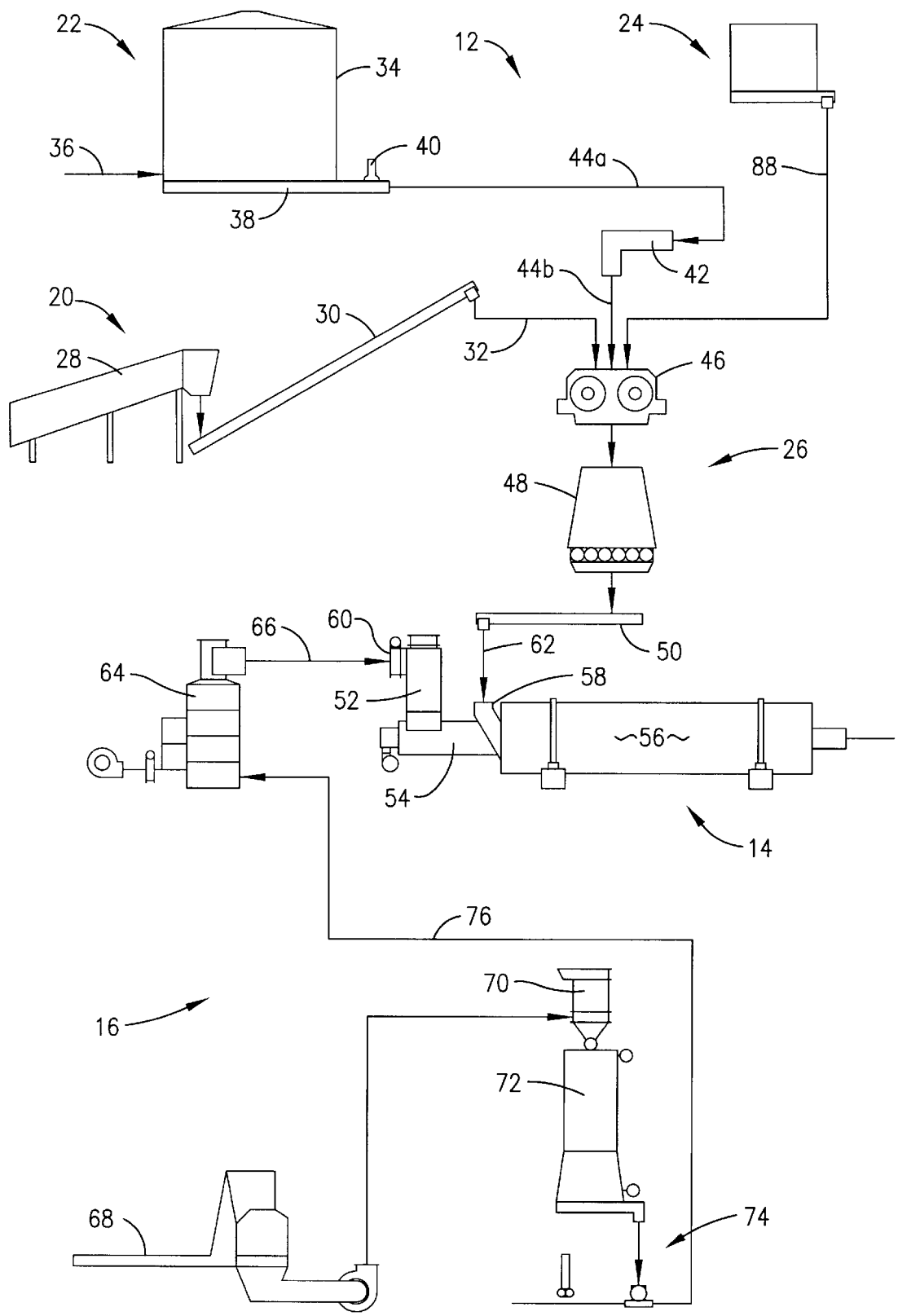
FIG. 1(a) is a schematic illustration depicting the left half of the preferred process by which the animal feeds of the invention are formed.
Figure 1B:
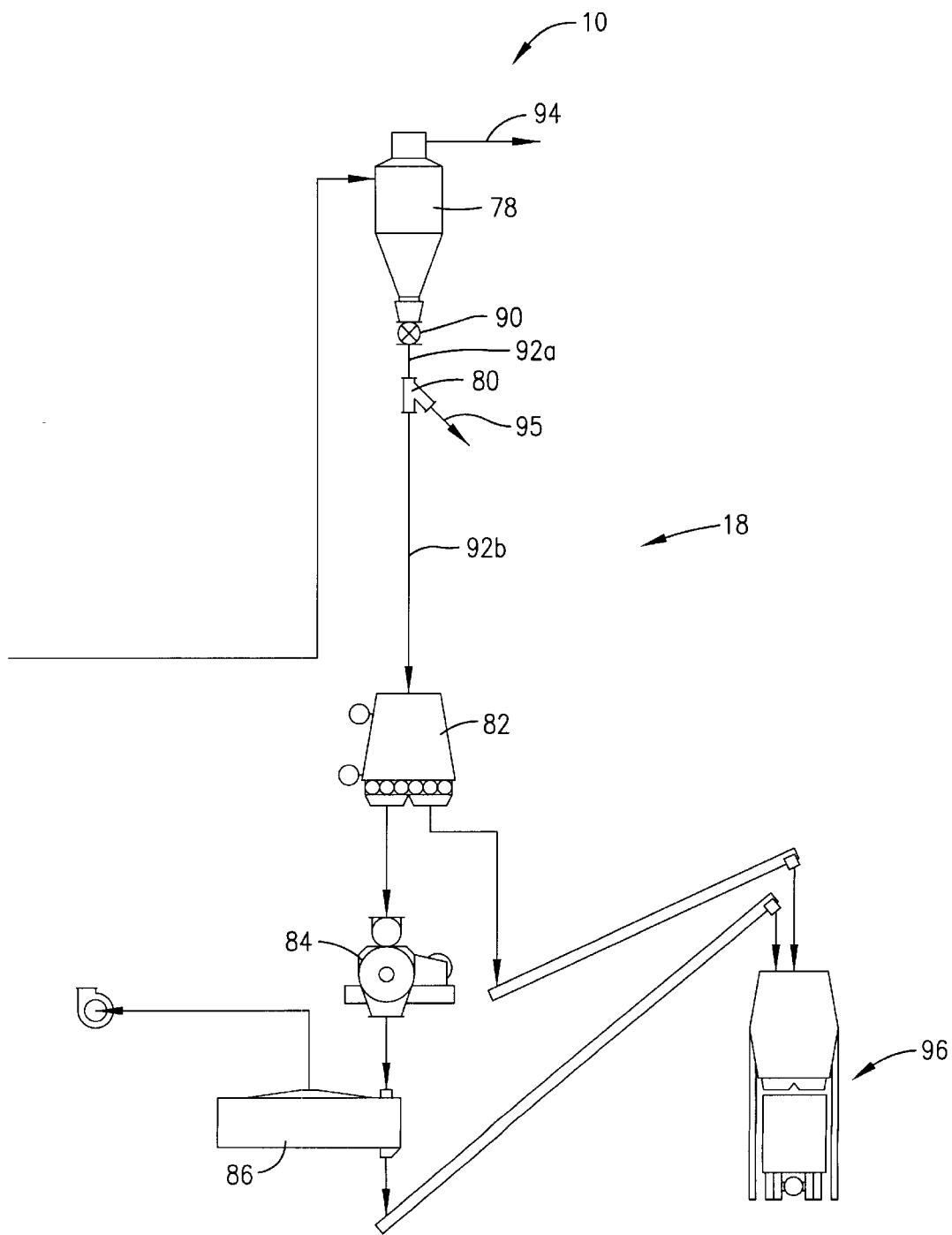
FIG. 1(b) is a schematic illustration depicting the right half of the preferred process by which the animal feeds of the invention are formed, to be viewed in conjunction with FIG. 1(a).

Turning now to the Figures, the overall apparatus 10 used in the processes of the invention includes a collection and mixing section 12, a dryer 14, a fuel metering portion 16, and a separation and forming stage 18. Raw untreated poultry house liner and poultry slaughterhouse wastewater (including blood serum and bio-sludges) are collected in section 12 and passed through dryer 14 and separation forming stage 18 to produce the ultimate end product, as will be seen from a study of the flow lines in the figures.

In more detail, section 12 of apparatus 10 includes a poultry house litter metering section 20, a wastewater sludge supply 22, a dried product recycling bin 24, and a mixing and metering section 26. Section 20 is schematically represented in FIG. 1(a) as including a self-feeder 28 which serves to deliver poultry house litter from a delivery source (not shown) to conventional conveyer structure 30 for transport to mixing and metering section 26 as indicated by line 32. Supply 22 includes a liquid storage tank 34 which receives and stores wastewater sludges from a delivery source (such as a tanker truck) as represented by line 36. Tank 34 includes an outlet line 38 and a metering pump 40 for delivering the sludges to heater 42 and on to section 26 as indicated by lines 44a, 44b, respectively. Mixing and metering section 26 includes a conventional pug mill mixer 46, a live-bottom metering bin 48, and conventional conveying structure 50.

Dryer 14 is a commercially available hot air convection rotary drum dryer which includes a fossil fuel burner 52, a combustion tube 54, an internally flighted rotary drum 56, a product inlet 58, and a fossil fuel inlet 60. Dryer 14 is operable to sterilize and dewater the material coming from section 26 via line 62. While any conventional hot air convection rotary drum dryer is suitable for use in the instant invention, a particularly preferred dryer is the Model 3PHV Dehydrator available from Productization, Inc., Independence, Kans.

Fuel metering portion 16 is schematically illustrated to include a device 64 for directly feeding biofuels into inlet 60 of dryer 14 via line 66. Or, in order to conserve fuel, wood boxes or the like can be ground in a flow control wood box grinder 68, fed into bag filter 70, and stored in biofuels metering silo 72. The fuel can then be metered via fuel feeder and high pressure pump 74 and fed to device 64 as indicated by line 76. Those skilled in the art will understand that this is just one of many ways by which fuel can be provided to dryer 14.

Separation and forming stage 18 includes a conventional cyclone separator 78, a two-way recycling valve 80, a biofeeds metering bin 82, a densification or pellet mill 84, and a cooler 86.

In operation, poultry house litter is transported via structure 30 to mixer 46. It will be appreciated that any litter (regardless of its composition) from a poultry house can be utilized in the products and methods of the invention. Generally, this litter will comprise poultry droppings, feathers, bedding material (such as wood shavings, straw, rice hulls, peanut hulls, and mixtures thereof), poultry feed, and mixtures thereof. Wastewater sludges are likewise delivered to mixer 46, either directly or, if during cold weather, through heater 42 which keeps the sludge mixture in liquid form. While most wastewater sludges comprise about 85% by weight water and about 15% by weight solids, other water and solids concentrations can be utilized in the instant invention. The wastewater sludges generally comprise all wastes which result from the process of slaughtering poultry and other animals, including wastes such as fat, blood serum, bones, skin, viscera, offal, and mixtures thereof A quantity of dried meal is optionally fed from bin 24 into mixer 46 via line 88. Dried meal from bin 24 is used only for purposes of conditioning material which is too wet to handle in section 26. The quantity of dried meal used is adjusted by the operator, based upon his or her observations as to whether the material is too wet.

Mixer 46 then substantially mixes the materials from lines 32, 44b, and 88, and the resulting mixture is transferred to bin 48. The mixture is then metered to conveying structure 50 and fed into dryer 14 through material inlet 58. Those skilled in the art will understand that the residence time of the mixture in the dryer and the air temperature in the dryer should be adjusted so as to prevent the denaturation of the proteins in the mixture. For example, at higher temperatures a shorter residence time is necessary, while at lower temperatures a longer residence time is necessary. Preferably, the dryer inlet air has a temperature of from about 250–900° F., and more preferably from about 675–725° F. The mixture is then dried within drum 56 by being subjected to air having a temperature of from about 250–900° F., and more preferably from about 300–725° F. The residence time of the mixture in dryer 14 is from about 0.5–3 minutes, and preferably from about 1–2.5 minutes. As the dried mixture exits dryer 14, it should have a moisture content of from about 8–15% by weight, and preferably from about 10–14% by weight, based upon the total weight of the dried mixture taken as 100% by weight. The dried meal is then air transported to separator 78 under negative pressure, delivered through air lock 90 and line 92a, and then delivered through valve 80 and line 92b to metering bin 82. Optionally, in geographical locations where regulations so require, the dried meal may be transferred from separator 78 to a conventional odor particulate scrubber system (not shown) as schematically indicated by line 94. After odor removal, the meal can then be used as a feed with no further processing being required, or the meal can be pelletized if desired. Also, a portion of the dried meal passing through valve 80 may be directed to bin 24 (as indicated by line 95) to be used as dry meal in instances where the mixture within mixer 46 is too wet to handle.

From bin 82, the dried meal is ready to be used as a feed and can be transported to a truck 96 for delivery to livestock feeders. Alternately, if a pelleted feed is desired, the dried meal can be pelletized by any known pelletization methods. For example, the dried meal can be delivered from bin 82 to conventional densification mill or pelletizer 84 followed by cooling in conventional cooler 86. The pellets can then be transported via truck 96 to the desired location. Those skilled in the art will realize that this high protein, high fat meal or pellet can be used for any animal (such as ruminants) whose diet would benefit from high protein and/or high fat. A particular advantage of the pelletized form of the instant invention is that it can be used as an aquatic feed due to its high fat content which allows the pellet to float.

EXAMPLES

The following examples set forth preferred methods in accordance with the invention. It is to be understood, however, that these examples are provided by way of illustration and nothing therein should be taken as a limitation upon the overall scope of the invention.

In each of the following examples, the poultry house litter used was taken from a sample having 20% by weight moisture (based on the total weight of the litter taken as 100% by weight) and a density of 32.5 lbs/ft³. The DAF sludge used in each example was taken from a sample having 80% by weight moisture, based on the total weight of the sludge taken as 100% by weight. All concentrations of components and a particular composition or product are reported herein in percent by weight based on the total weight of the composition or product taken as 100% by weight, unless stated otherwise.

Example 1

In this test, one pound of poultry house litter was mixed with 0.75 lbs of DAF (Deaerated Air Flotation) sludge in a standard pug mill mixer. The resulting mixture (which was 40% by weight moisture) was metered and screw fed into the inlet of a rotary air convection dryer (Model 3PHV, available from Productization, Independence, Kans.) having air heated to a temperature of 700° F. The residence time of the mixture in the dryer was about 0.5–1 minutes. The resulting meal was dried to a moisture content of 8.5% by weight and had a density of 29 lbs/ft³.

The finished meal was tested for various components after which it was dried in a calorimeter to remove substantially all of the moisture. This dried meal was also tested for various components. The test results are reported in Table 1 below.

TABLE 1

| Component | Finished Meal[b] | Dry matter[c] |
|---|---|---|
| Moisture (% by wt.)[a] | 9.7 | N/A |
| Dry matter (% by wt.)[a] | 90.3 | N/A |
| Crude protein (% by wt.)[a] | 25.1 | 27.8 |
| Crude Fiber (% by wt.)[a] | 9.1 | 10.0 |
| Crude Fat(% by wt.)[a] | 12.1 | 13.4 |
| Ash (% by wt.)[a] | 15.38 | 17.02 |
| Calcium (% by wt.)[a] | 2.26 | 2.51 |
| Phosphorous (% by wt.)[a] | 1.57 | 1.74 |
| Potassium (% by wt.)[a] | 2.36 | 2.61 |
| Copper (ppm) | 563 | 623 |

[a]Based upon the total weight of the product taken as 100% by weight.
[b]Refers to the finished meal prior to drying to remove substantially all moisture.
[c]Refers to meal which has been dried to remove substantially all moisture.

Example 2

In this test, the same procedure was followed as described in Example 1 except that 1 lb of litter was mixed with a 0.5 lb of sludge. The resulting mixture had a 38% by weight moisture content. After drying as described in Example 1, the meal contained 7% by weight moisture and had a density of 29 lbs/ft³. The finished meal was tested for various components after which it was dried in a calorimeter to remove substantially all of the moisture. This dried meal was also tested for various components. The test results are reported in Table 2 below.

TABLE 2

| Component | Finished Meal[b] | Dry matter[c] |
|---|---|---|
| Moisture (% by wt.)[a] | 11.2 | N/A |
| Dry matter (% by wt.)[a] | 88.8 | N/A |
| Crude protein (% by wt.)[a] | 24.5 | 27.6 |
| Crude Fiber (% by wt.)[a] | 10.2 | 11.4 |
| Crude Fat (% by wt.)[a] | 9.5 | 10.7 |
| Ash (% by wt.)[a] | 15.54 | 17.5 |
| Calcium (% by wt.)[a] | 2.29 | 2.58 |
| Phosphorous (% by wt.)[a] | 1.58 | 1.78 |
| Potassium (% by wt.)[a] | 2.42 | 2.72 |
| Copper (ppm) | 572 | 645 |

[a]Based upon the total weight of the product taken as 100% by weight.
[b]Refers to the finished meal prior to drying to remove substantially all moisture.
[c]Refers to meal which has been dried to remove substantially all moisture.

Example 3

In this example, 2 lbs of house poultry litter was mixed with 1.5 lbs of sludge and the resulting mixture was dried to 12% by weight moisture as described in Example 1. Next, 1.5 lbs of sludge was added to the dried meal, and the mixture was again dried (as set forth in Example 1) to a meal containing 13% by weight moisture. Another 1.0 lbs of sludge was added to this further dried meal, and the resulting mixture was dried again as set forth in Example 1 to a meal having a total moisture content of 8% by weight and a density of 25 lbs/ft³. The finished meal was tested for various components after which it was dried in a calorimeter to remove substantially all of the moisture. This dried meal was also tested for various components. The test results are reported in Table 3 below.

TABLE 3

| Component | Finished Meal[b] | Dry matter[c] |
|---|---|---|
| Moisture (% by wt.)[a] | 9.9 | N/A |
| Dry matter (% by wt.)[a] | 90.1 | N/A |
| Crude protein (% by wt.)[a] | 24.2 | 26.8 |
| Crude Fiber (% by wt.)[a] | 6.6 | 7.3 |
| Crude Fat (% by wt.)[a] | 23.4 | 25.9 |
| Ash (% by wt.)[a] | 12.28 | 13.64 |
| Calcium (% by wt.)[a] | 1.85 | 2.06 |
| Phosphorous (% by wt.)[a] | 1.32 | 1.47 |
| Potassium (% by wt)[a] | 1.89 | 2.10 |
| Copper (ppm) | 479 | 532 |

[a]Based upon the total weight of the product taken as 100% by weight.
[b]Refers to the finished meal prior to drying to remove substantially all moisture.
[c]Refers to meal which has been dried to remove substantially all moisture.

Example 4

In this example, 2 lbs of litter was mixed with 6 lbs of sludge, and the resulting mixture was dried (as described in Example 1) to a moisture content of 6% by weight based on the total weight of the dried mixture taken as 100% by weight. Two pounds of sludge was then mixed with the dried mixture, and the resulting mixture was again dried to a moisture content of 6% by weight. Two more pounds of sludge were added to the mixture, and the resulting mixture was dried again to yield a meal having a moisture content of 7% by weight and a density of 25 lbs/ft³.

Example 5

One pound of litter was mixed with one pound of sludge, yielding a mixture having a total moisture content of 45% by weight. This mixture was too wet to screw feed, and therefore was hand-fed into the rotary air convection dryer and dried (as in Example 1) to a meal having a moisture content of 15% by weight and a density of 27 lbs/ft$^3$. The finished meal was tested for various components after which it was dried in a calorimeter to remove substantially all of the moisture. This dried meal was also tested for various components. The test results are reported in Table 4 below.

TABLE 4

| Component | Finished Meal[b] | Dry matter[c] |
|---|---|---|
| Moisture (% by wt.)[a] | 20.3 | N/A |
| Dry matter (% by wt.)[a] | 79.7 | N/A |
| Crude protein (% by wt.)[a] | 24.4 | 30.6 |
| Crude Fiber (% by wt.)[a] | 6.8 | 8.6 |
| Crude Fat (% by wt.)[a] | 12.5 | 15.7 |
| Ash (% by wt.)[a] | 13.03 | 16.35 |
| Calcium (% by wt.)[a] | 1.78 | 2.23 |
| Phosphorous (% by wt.)[a] | 1.23 | 1.54 |
| Potassium (% by wt.)[a] | 1.91 | 2.39 |
| Copper (ppm) | 452 | 567 |

[a]Based upon the total weight of the product taken as 100% by weight.
[b]Refers to the finished meal prior to drying to remove substantially all moisture.
[c]Refers to meal which has been dried to remove substantially all moisture.

I claim:

1. A method of forming an animal feed comprising the steps of:
   forming a mixture comprising water, a first component selected from the group consisting of animal excrement, feathers, poultry feed, poultry bedding material, and mixtures thereof, and a second component selected from the group consisting of fat, blood serum, bones, skin, viscera, and mixtures thereof; and
   removing at least a portion of said water by subjecting said mixture to rotary drum hot air convection drying, said hot air convection drying comprising the steps of subjecting said mixture to hot air having a temperature of from about 500–900° F. for a period sufficient to reduce the total water content of the mixture to a level of less than 15% by weight, based upon the weight of said product taken as 100% by weight.

2. The method of claim 1, wherein said first component is animal excrement, and said excrement is poultry manure.

3. The method of claim 1, wherein said first component is poultry feed.

4. The method of claim 1, wherein said ingredient of said second component is selected from the group consisting of poultry fat, poultry blood serum, poultry bones, poultry skin, poultry viscera and mixtures thereof.

5. The method of claim 4, wherein said ingredient is poultry fat.

6. The method of claim 1, wherein said second component comprises from about 80–90% by weight water, based upon said second component weight taken as 100% by weight.

7. The method of claim 1, wherein said second component comprises from about 10–30% by weight fat, based upon said second component weight taken as 100% by weight.

8. The method of claim 1, wherein the product of said removing step has a total fat content of at least about 10% by weight, based upon the weight of the product taken as 100% by weight.

9. The method of claim 1, wherein the product of said removing step has a protein concentration of at least about 15% by weight, based upon the weight of the product taken as 100% by weight.

10. The method of claim 1, wherein the hot air of said removing step has a temperature of from about 600–800° F.

11. The method of claim 1, wherein the subjecting of said mixture to hot air convection is carried out for a time period of from about 0.5–3 minutes.

12. The method of claim 1, wherein the product of said removing step has an average particle size of less than about 1/16 in.

13. The method of claim 1, further including the steps of:
    mixing a third component with the product resulting from said removing step to yield a second mixture, said third component being selected from the group consisting of water and an ingredient selected from the group consisting of fat, blood serum, bones, skin, and viscera, and mixtures thereof; and
    removing at least a portion of said water by subjecting said mixture to hot air convection.

14. The method of claim 13, wherein said first component is animal excrement, and said excrement is poultry manure.

15. The method of claim 13, wherein said first component is poultry feed.

16. The method of claim 13, wherein said ingredient of said second component is selected from the group consisting of poultry fat, poultry blood serum, poultry bones, poultry skin, poultry viscera and mixtures thereof.

17. The method of claim 16, wherein said ingredient is poultry fat.

18. The method of claim 13, wherein the product of said removing step has a total fat content of at least about 20% by weight, based upon the weight of the product taken as 100% by weight.

19. The method of claim 13, wherein the product of said removing step has a protein concentration of at least about 15% by weight, based upon the weight of the product taken as 100% by weight.

20. The method of claim 1, further including the step of forming the product resulting from said water removing step into pellets.

21. The method of claim 13, further including the step of forming the product resulting from said second water removing step into pellets.

* * * * *